Sept. 24, 1957 F. C. SPINNER, JR 2,807,271
WASHING APPARATUS FOR AUTOMOBILE LAUNDRIES
Filed Dec. 13, 1955
2 Sheets-Sheet 1
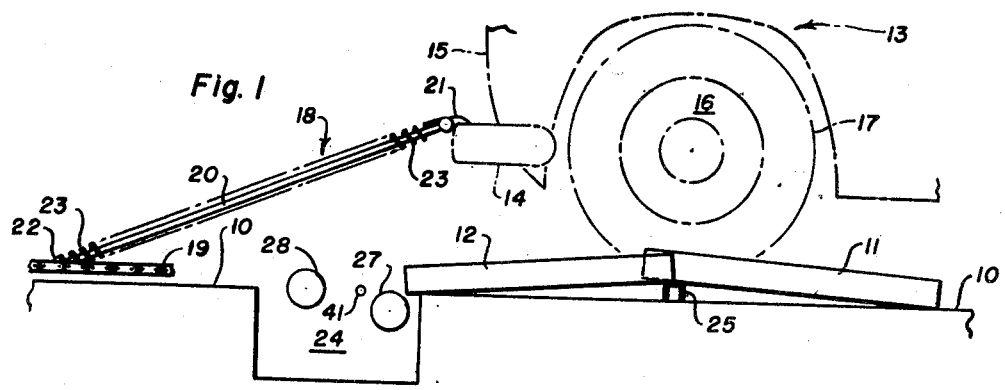
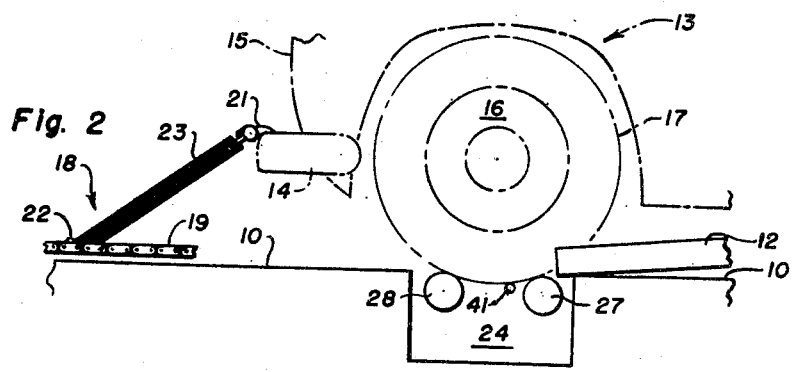
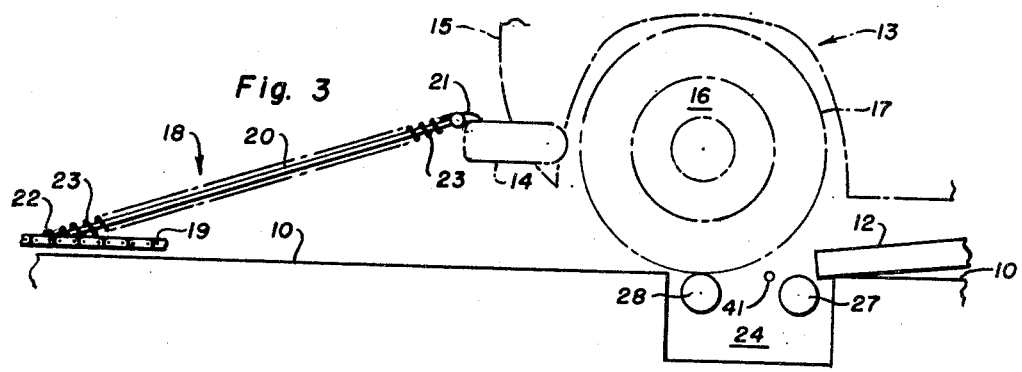
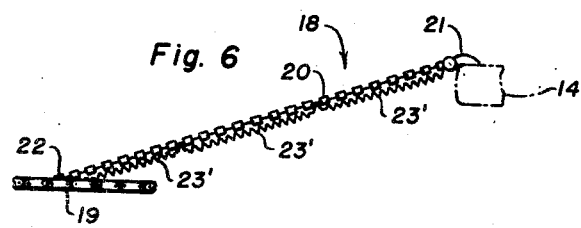
Frank C. Spinner, Jr.
INVENTOR.
ATTORNEYS Sept. 24, 1957  F. C. SPINNER, JR  2,807,271
WASHING APPARATUS FOR AUTOMOBILE LAUNDRIES
Filed Dec. 13, 1955  2 Sheets-Sheet 2

Frank C. Spinner, Jr.
INVENTOR.

BY
ATTORNEYS.

United States Patent Office 2,807,271
Patented Sept. 24, 1957

2,807,271

WASHING APPARATUS FOR AUTOMOBILE LAUNDRIES

Frank C. Spinner, Jr., New York, N. Y.

Application December 13, 1955, Serial No. 552,836

12 Claims. (Cl. 134—45)

The present invention relates to improvements in apparatus for continuously washing vehicles.

More particularly it relates to apparatus for positioning, rotating and washing the wheels and tires of an automobile in an installation commonly known as an "auto laundry."

Generally in such an installation the automobiles to be washed are connected to a continously moving conveying means and moved along a track adjacent to which are located several stations whereat washing, rinsing, drying and whatever other operations which may be desired are performed on various parts of the automobile by automatic devices designed for that purpose or by manual means, as the case may be. In operating such a laundry it is very desirable, for reasons which are readily obvious, to keep the conveying means in continuous motion and to have the automobile connected to the conveying means at all times during the washing, rinsing, drying and other operations from the time it is first connected thereto until, after all operations have been completed, it has been finally released therefrom. However, as will be more fully described hereinbelow, it is desirable to slow down or halt the motion of the automobile during the wheel washing operation sufficiently to permit several complete revolutions of the wheels by the wheel spinning mechanism associated with the wheel washing apparatus. To slow down or halt the conveyor means when one car is at the wheel washing station would necessitate the halting or slowing down of all the other automobiles connected thereto at the same time. Since they would not necessarily be at stations where such a halt in the movement of such other cars would be desirable, such slowing down or halting of the conveyor means would render the operation of the auto laundry inefficient. If alternatively, the automobile which is slowed down or halted while its wheels are being washed is detached from the conveyor means, labor requiring some amount of skill is necessary to re-attach it thereto after the wheel washing operation is completed. Usually this means that an attendant within a narrowly limited space of time must attach a chain, cable or other connecting member hanging loosely from the automobile to the moving conveyor means. This is not an easy operation and failure to perform it within the time allotted will cause a second automobile still connected to the conveyor means to be brought up to the standing automobile.

Several attempts have been made to overcome this problem presented by the necessity of having the wheel washing device operate during several complete revolutions of the wheels to be washed. One such arrangement comprises a moveable carriage on which is mounted the wheel washing device which is adapted to travel in a pit under the flooring supporting the track for a distance equal at least to the length of the circumference of the wheel and at the end of the wheel washing operation to be returned to its original position. In such an arrangement the progress of the automobile is not slowed down or halted. Among the most serious disadvantages which may be noted in connection with this arrangement are the necessity of the very careful spacing which is required particularly where automobiles of different wheel sizes and wheel bases are processed so that the carriage, after the front wheels have been washed, is returned to its original position before the rear wheels come into position to be washed and the possibility that should the carriage not have returned to its original position before another pair of wheels arrives at the wheel washing position, serious damage to the automobile would result. In another arrangement the automobile is halted during the wheel washing operation but the conveyor means are not halted nor is the automobile the wheels of which are to be washed detached therefrom. In such an arrangement the automobile is brought to a standstill while the wheels, turning through at least one complete revolution are washed and this is accomplished without stopping the conveyor means or without detaching the automobile the wheels of which are being washed therefrom. In order to do this the arrangement creates a slack in the member connecting the automobile to the conveyor means by abruptly dropping the wheels of the automobile into a hollow below the level of the flooring supporting the track where they rest momentarily on three rollers which spin the wheels. When the slack in the connecting member is taken up by the progress of the conveyor means the automobile is again pulled forward so that the wheels which have just been washed are pulled up and return to the tracks and continue therealong. There are certain serious disadvantages to such an arrangement. Firstly, the wheels of the automobile drop abruptly from the floor of the installation to the rollers, an appreciable distance and therefore land with some force on the rollers which turn the wheels during the washing operation. The force of this drop may be so great as to cause the automobile to rock back and forth to such an extent that the wheels may never settle in proper position for cleaning. Secondly, unless the distance the wheels of the automobile drop is so great that danger of injury to the automobile exists and undue stress is put on the conveyor mechanism, it is difficult in apparatus of this design to obtain a halt of sufficient duration to spin the wheels a sufficient number of revolutions to accomplish adequate washing.

It is an object of the present invention to provide an arrangement in a continuous automobile washing installation by which the wheels of the automobile, after the speed of the automobile has been accelerated beyond that of the conveyor means and then the speed thereof substantially retarded, may be rotated and washed when the automobile is at or is approaching a standstill without stopping the conveyor means or detaching the automobile therefrom.

It is an object of the present invention to provide an arrangement in a continuous automobile washing installation by which the wheels of the automobile may be rotated and washed when the automobile is at or approaching a standstill without stopping the conveyor means or detaching the automobile therefrom in which the disadvantages of the prior art are overcome.

It is an object of the present invention to provide an arrangement in a continuous automobile washing installation by which the wheels of the automobile may be rotated and washed when the automobile is at or approaching a standstill without stopping the conveyor means or detaching the automobile therefrom in which the speed of travel of the automobile is increased while all the automobile wheels remain near the floor level of the installation.

It is an object of the present invention to provide an arrangement in a continuous automobile washing installation by which the wheels of the automobile may be rotated and washed while the automobile is approaching or is at a standstill without stopping the conveyor means or detaching the automobile therefrom and in which the speed of the automobile is increased above that of the conveyor before the automobile wheels reach the wheel washing position.

It is an object of the present invention to provide an arrangement in a continuous automobile washing installation by which the wheels of the automobile may be rotated and washed when the automobile is approaching or is at a standstill without stopping the conveyor means or detaching the automobile therefrom in which there is in combination with the connecting member a spring member which even when the automobile is at rest exerts a force thereon in the direction of travel of the conveyor means.

It is an object of the present invention to provide in a continuous automobile washing installation having a continuously moving conveyor means a wheel washing arrangement in which the speed of the automobile is first accelerated above that of the conveyor means and is then retarded by cushioning means as the wheels of the automobile enter the wheel washing station, in which the wheels remain near floor level at the wheel washing station, and in which the cushioning means is retractable to facilitate exit of the wheels from the wheel washing station.

It is an object of the present invention to provide an arrangement in a continuous automobile washing installation by which the wheels of the automobile may be rotated and washed when the automobile is approaching or is at a standstill without stopping the conveyor means or detaching the automobile therefrom in which as the automobile approaches or comes to rest the wheels thereon about to be washed are momentarily supported by a retractable member positioned above the level of the floor of the installation and are then lowered while cushioned by the retraction of said member to the floor level.

It is an object of the present invention to provide an arrangement in a continuous automobile washing installation by which the wheels of the automobile may be rotated and washed when the automobile is approaching or is at a standstill without stopping the conveyor means or detaching the automobile therefrom in which the force applied by the conveyor means through the connecting member to the automobile to continue the travel of the automobile is applied in a smooth manner.

The present invention will be best understood from a consideration of the detailed description in the following specification taken in connection with the accompanying drawings forming a part of the present application with the understanding, however, that the invention is not confined to any strict conformity with the showing of the drawings but may be changed or modified, so long as such changes or modifications mark no material departure from the salient features of the invention as expressed in the appended claims.

In the drawings:

Figure 1 is a side view showing certain parts comprising a preferred embodiment of my invention, but chiefly diagrammatic, at a point before an automobile is brought into position to have its front wheels washed;

Figure 2 is a similar view when the automobile is in the position of having its front wheels washed;

Figure 3 is a similar view where the forward progress of the automobile has just started after its front wheels have been washed;

Figure 6 shows a modification of the connecting member.

Figure 4:
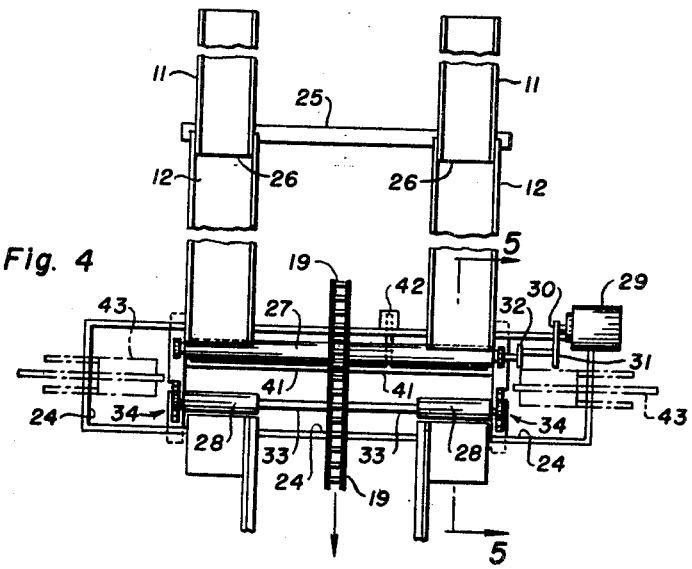
Figure 4 is a plan view of the arrangement of parts of the preferred embodiment of my invention being partially cut away.

Referring to the figures in general 10 represents a portion of the floor of the building or structure in which the automobile washing installation is situated. Along this floor is laid a pair of tracks, not shown, for the guidance of the travel of the automobile through the installation and past the stations where the various washing, rinsing, drying and other operations are performed. Each of the tracks of this pair may be of conventional design and may consist of a metallic channel bar which is suitably attached to the floor, is of sufficient width to accommodate the wheels of the automobiles to be washed and has upturned flanges of sufficient depth to keep the automobile from running off the track so formed. Any other track arrangement that will properly guide the automobile is satisfactory. At the portion of the installation where the automobile wheels are to be washed two sections of each track are arranged to form a pair of ramps 11 and 12 which as the automobile is drawn along the track raise and then lower the front wheels and as the automobile is further drawn along the track raise and lower the rear wheels. Each ramp of pairs 11 and 12 is of a design similar to the track mentioned hereinabove, that is, it consists of a channel bar of sufficient width to accommodate the wheels of the automobiles to be washed and has upturned flanges of sufficient depth to keep the automobiles from running off the ramps.

The automobile a portion of which is shown in Figures 1, 2 and 3 and designated generally as 13 comprises for the purposes of the present invention a bumper 14, fender portion of the body 15, wheel 16 and tire 17. Attached in a suitable manner to automobile 13 such as by securely hooking it over bumper 14 or to any other suitable place on automobile 13 is connecting member 18. The other end of connecting member 18 is securely but removably attached in any suitable manner to conveyor means 19.

Connecting member 18 comprises a cable, chain or similar member 20 extending from the member 21 which secures it to automobile 13 to the member 22 which secures it to the conveyor means 19 with spring 23 attached to it at both ends thereof. Spring 23 may surround cable or chain member 20 or may merely be attached thereto at its ends. Spring 23 is designed so that in its normal untensioned position it is a little less than one-half the length of cable or chain 20 lying between the points where it is attached thereto and can be stretched by the power applied to conveyor means 19 to such full length of cable or chain 20. Spring 23 may be a single unit or it may be divided into two or more parts each of which is attached to cable or chain 20 at the ends of such parts. While springs 23 may be omitted in some types of installations, it has been found of great advantage in a large number of types of installations in order to assure travel of the automobile through the installation in a smooth manner.

Figure 5:
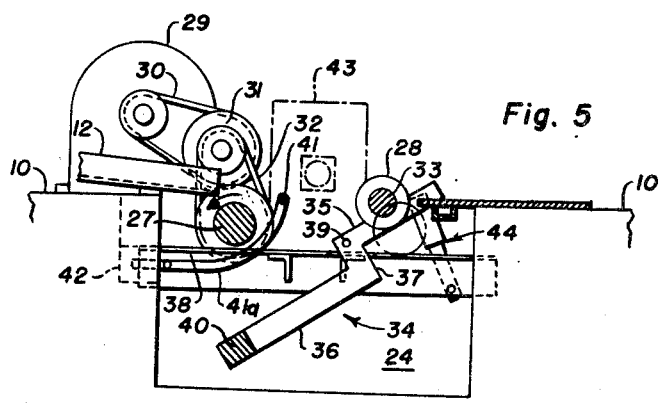
Figure 5 is a section on line 5—5 of Figure 4.

Conveyor means 19 is continuously driven by proper motive power of conventional design in a direction to move the automobile attached thereto and in the process of being washed from right to left as viewed in Figures 1, 2 and 3, from top to bottom as viewed in Figure 4 and from left to right as viewed in Figure 5.

Situated closely to the left hand end as viewed in Figures 1, 2 and 3 and the right hand end as viewed in Figure 5 of down ramp 12 there is formed in floor 10 a pit 24 which extends across a space wider than the tracks formed by ramps 12. While as stated above this pit is located closely to the lower end of ramps 12 it should be noted as is readily discernible from all the figures that the lower ends of ramps 12 slightly overlap the side wall of pit 24 and thus extend slightly over pit 24 but do not extend appreciably below the level of floor 10.

As shown in the figures and more particularly in Figures 1, 2 and 3, ramp 11 is tilted so that as automobile 13 is drawn along it front wheels 16 are raised above the level of floor 10 and ramp 12 is tilted so that as automobile 13 is drawn along it front wheels 16 are returned to the level of floor 10. The proper positioning of ramps 11 and 12 may be accomplished by placing thereunder and on floor 10, tilting block 25 as shown in Figures 1 and 4. Tilting block 25 may be of any suitable material of sufficient strength to serve the purpose and may be attached to floor 10 or, if so desired, lie loosely thereon. It should be positioned near the center of the assembly of each of ramps 11 and 12 so that the inner ends of each of those ramps are raised to the extent desired but it is immaterial whether both ramps 11 and 12 are supported on it or whether it supports the ends of one pair of ramps and the ends of the other pair of ramps are designed and positioned to lie within the ends of the pair of ramps so supported. In such a case it is preferable that the overlapping tongues 26 of ramps 11 extend over the other pair of ramps 12 so that the automobile 13 is given a slight initial impetus as its wheels pass from ramps 11 to ramps 12 and before they start the descent down ramps 12.

Located in pit 24 are rollers 27 and 28 which extend across substantially the width of pit 24 but at least for a distance representing that between the outer sides of pairs of ramp 12. Roller 27 which is located as shown in Figures 1, 2, 3 and 5 at the side of pit 24 which is adjacent to ramp 12, that is, as may be said the side of pit 24 from which automobile 13 enters that location, is, as may be shown by reference to Figures 4 and 5 driven by suitable mechanism such as motor 29, belt or chain 30, drive wheel 31 and belt 32 so that it rotates about or with its shaft. Roller 27, however, although free to rotate, is otherwise not moveable and is thus fixedly mounted on suitable supporting structure in pit 24 in a position so that its top is approximately at or slightly above the plane of floor 10. Roller 28 is free to rotate about its shaft but in the preferred embodiment shown in the figures is not driven except as is hereinbelow more fully described by the rotation of automobile wheel 16. Further roller 28 is not fixedly positioned in pit 24 but may be moved from an original or rest position wherein its axis is substantially above the plane of floor 10 as is shown particularly in Figure 1 to a second or operating position as shown in Figures 2 and 3 and in broken lines in Figure 5. In this second position top surface of roller 28 is approximately level with or slightly below the top surface of roller 27.

Referring to Figures 1, 2 and 3 there is plainly shown associated with roller 27 switch actuator 41 which is depressible by contact with and pressure thereon of wheels 16. Further design and functioning of switch actuator 41 will be discussed with relation to the description of Figures 4 and 5.

Referring specifically to Figure 5 the construction and operation of moveable roller 28 will now be more fully described. As above stated roller 28 is rotatably mounted on shaft 33 which in turn is supported on bracket 34. Bracket 34 may be of any desired shape but as shown in Figure 5 consists of two elongated portions 35 and 36 offset from each other by a connecting portion 37 which is pivoted to plate 38 mounted below the level of floor 10 in pit 24 at 39. At or near the end of elongated portion 36 of bracket 34 there is mounted counterweight 40 of proper weight and in the proper position to accomplish the results desired and described in detail hereinbelow. In addition to counterweight 40 there is attached between a suitable place on bracket 34 and a suitable place on the wall of pit 24 a shock absorber preferably of the strut type as shown at 44.

Switch actuator arm 41 is mounted relatively close to stationary roller 27 and in such a position that as soon as a pair of wheels 16 enter the wheel washing station it is depressed. The depression of switch actuator arm 41 operates switch contacts 42 to close electrical circuits to start motor 29 and wheel washing device 43. Wheel washing device 43 is of any suitable conventional design and may be a series of steam or hot water spray nozzles which may or may not be combined with properly chosen brushes or other scrubbing members. Likewise the wheel spinning mechanism hereinbefore described as motor 29, belt or chain 30, drive wheel 31 and belt 32 may be of any suitable design or arrangement so long as it operates to spin a pair of wheels 16 a sufficient number of times while automobile 13 is slowed down or stopped at the wheel washing station. In practice in most installations it has been found that for efficient washing of the wheels and tires the wheels must rotate at least three complete revolutions during the wheel and tire washing operation. It is to be understood that the type and location of switch actuator arm 41 and the design of switch contacts 42 may be of any conventional design and arrangement the sole requirement for the purposes of the present invention being that they operate to close the necessary circuits promptly upon entry of a pair of wheels into the wheel washing station. It is further to be noted that the counterweight and shock absorber arrangement shown in Figure 5 may be of any convenient conventional arrangement, the sole requirement here for the purposes of the present invention being that that arrangement operate to cushion effectively the descent of automobile wheels 16 as they roll off ramp 12. It is further obvious that roller 28 may be power driven and roller 27 driven by the automobile wheels 16 instead of as shown in the arrangements of the figures, but economy of design and operation in practically all cases dictates that the roller the shaft of which is stationary be the power driven roller.

Rollers 27 and 28 may extend at equal diameter for the entire distance of their length as shown with respect to roller 27 in Figure 4 or may be in two parts each of which merely extend a little more than the width of each ramp 11 or 12 and between such points only a shaft 33 as shown in Figure 4 with respect to roller 28 connects their parts. Likewise switch actuator arm 41 may as shown in Figure 4 extend to sufficient length to allow both wheels 16 of a pair to bear upon it or it may be cut off so that only one wheel 16 of a pair bears upon it.

Figure 6 shows a modification of my compound connecting member 18 in an extended position. In this modification, as in the embodiment shown in the other figures, chain member 20 is provided at one end with a member 21 for attaching it to the car 13 to be washed and is provided at the other end with a member 22 to attach it to conveyor means 19. However, in this modification spring member 23 instead of being in one piece and surrounding chain member 20, as is shown on the other figures, consists of three separate sections 23' each of which is attached at each of its ends to chain member 20 and each of which lies substantially parallel to chain member 20 but not necessarily surrounding it. The total length of all of the spring sections 23' should in their normal condition, that is, not stretched, be about one-half the length of the portion of chain member 20 between which the outer ends of the outermost sections are attached.

Referring now particularly to Figures 1, 2 and 3 the operation of the device will be described. Conveyor means 19 acting through connecting member 20 pulls automobile 13 from right to left as viewed in Figures 1, 2 and 3 and has sufficient power to pull it up ramps 11. After front wheels 16 reach the top of ramps 11 they enter ramps 12 and coast down those ramps. The speed of conveyor means 19 and the angle of descent of ramps 12 are so interrelated that the average forward speed of automobile wheels 16 is sufficiently greater than that of conveyor means 19 so that tension may be removed from connecting member 18 and that member may become "slack" for a sufficient time to allow automobile wheels 16 to remain on rollers 27 and 28 for several complete revolutions of automobile wheels 16 in a manner to be described hereinbelow.

In actual installations automobile wheels 16 are spun up to ten revolutions while the automobile is at the wheel washing station. The number of revolutions so made by automobile wheels 16 depends upon the length of and angle of descent of ramps 12, the speed of conveyor means 19 and the speed at which roller 27 is driven.

Connecting member 18 however does not become completely slack because of the cooperation of spring 23 connected to the cable or chain 20 thereof as has been described hereinabove, if such spring is present. Due to the action of spring 23 during the descent of automobile wheels 16 on ramps 12 there is always some pull exerted on automobile 13. This prevents any possible stoppage of automobile 13 while wheels 16 are on ramps 12 which might otherwise be caused by such conditions as wheels 16 being out of alignment with ramps 12 so that they bear against one of the flanges of those ramps or friction in the parts of automobile 13 making it sluggish in coasting and thereby preventing it from attaining the coasting speed desired. Further the presence of spring 23 in the assembly of connecting member 18 prevents, due to the tension exerted thereby, that member from becoming completely loose or slack and thus from becoming detached either from bumper 14 or conveyor member 19.

After automobile wheels 16 have coasted down ramps 12 the surfaces of tires 17 proceed forward until they touch roller 28 which as hereinabove stated presents a surface to tire 17 above the level of floor 10. The portion of the weight of car 13 on roller 28 depresses that roller from the position shown in Figures 1 and 5 to that shown in Figure 2 and by broken lines in Figure 5 as is above described. Due to counterweight 40 and shock absorber 44 this change in position of roller 28 and the consequent lowering of automobile wheels 16, although commencing as soon as wheels 16 rest against roller 28, is accomplished in an even and gentle manner with no jar or shocks to automobile 13 or any part of the installation.

As soon as switch actuator arm 41 is depressed by wheels 16 it operates switch contacts 42 which close circutis starting motor 29 and wheel washing device 43. Since motor 29 rotates roller 27 and wheels 16 are in contact with that roller, wheels 16 revolve as soon as motor 29 is in operation and since roller 28 is free to rotate on its axis, it is rotated by the revolution of wheels 16 as soon as they contact that roller. Motor 29 and wheel washing device 43 continue in operation until switch arm 41 opens switch contacts 42 which occurs as soon as wheels 16 are removed from switch arm 41. Due to the arrangement of having switch actuator arm 41 start the wheel spinning operation and the wheel washing operation as soon as a pair of wheels 16 enter the wheel washing station and the fact that counterweight 40 and shock absorber 44 delay the depression of moveable roller 28, in many installations particularly with automobiles of relative light weight the entire wheel washing operation may be accomplished without bringing automobile 13 to a complete rest. In such installations the forward speed of automobile 13 while it is in the wheel washing station is merely decelerated during the wheel washing operation. It is a further characteristic of the operation of the device that the wheels are spun and the wheel washing operation is started before moveable roller 28 is depressed and thus at the start of the wheel spinning and wheel washing operations the front wheels 16 of an automobile 13 are above their final position at the washing station and in many cases are actually above the level of floor 10.

Automobile wheels 16 remain on rollers 27 and 28 when they are in the position shown in Figure 2 for a desired length of time which has been predetermined by the relation of the angle of descent of ramps 12 and the speed of travel of conveyor means 19, but in any case long enough to permit roller 27 time to impart several complete revolutions to automobile wheels 16. At the end of this predetermined period conveyor means 19 has advanced to such a point that full tension is now applied to connecting member 18, spring 23 thereof being elongated to the full length of cable or chain 20 with the result that automobile 13 is again advanced. This point of the operation is clearly shown in Figure 3. It is to be particularly noted by reference to Figure 3 that at that point in the operation neither wheels 16 nor any other part of automobile 13 need be raised at all much less over a sharp corner to have it continue along the track of the installation because due to the position of roller 28 tires 17 are already supported thereby and by roller 27 near the level of floor 10.

Since the operation of the device with respect to the rear wheels of an automobile is with respect to all of the salient parts of the present invention identical it has not been deemed necessary to present representations of the operation with respect to the rear wheels in the drawing and it suffices to state that with respect to the bringing into position for the washing of the rear wheels, automobile 13 and the rear wheels are raised on ramps 11, lowered on ramps 12, their forward progress slowed down or brought to rest while bearing on rollers 27 and 28 which are near the level of floor 10 during the washing operation and pulled therefrom without the necessity of lifting the wheels or the automobile in exactly the same manner and by exactly the same means as has been hereinbefore described with respect to front wheels 16. It is to be noted, however, that the speed of depression of moveable roller 28 may vary between the front wheels and the rear wheels of an automobile because of the weight distribution between the front axle and rear axle of the automobile.

What I claim is:

1. In an automobile washing installation the combination of a floor, conveyor means attached by a connecting member to the automobile to be washed for moving said automobile to and away from a wheel washing position, means for supporting a pair of wheels of said automobile at said wheel washing position comprising a pair of rollers one of which has its upper surface approximately at the level of said floor and the other of which has its upper surface in one position above the level of said floor but is retractable to a second position wherein its upper surface is approximately at the level of said floor and means for increasing the speed of said automobile above that of said conveyor means as it approaches said wheel washing position.

2. In an automobile washing installation the combination of a floor, conveyor means attached by a connecting member to the automobile to be washed for moving said automobile to and away from a wheel washing position, means for supporting a pair of wheels of said automobile at said wheel washing position comprising a pair of rollers one of which has its upper surface approximately at the level of said floor and the other of which has its upper surface in one position above the level of said floor but is retractable to a second position wherein its upper surface is approximately at the level of said floor and means for increasing the speed of said automobile above that of said conveyor means as it approaches said wheel washing position wherein said last mentioned means comprise a pair of ascending ramps over which said automobile is pulled by said conveyor means and a pair of descending ramps adjacent said first roller down which said automobile coasts.

3. In an automobile washing installation the combination of a floor, conveyor means attached by a connecting member to the automobile to be washed for moving said automobile to and away from a wheel washing position, means for supporting a pair of wheels of said automobile at said wheel washing position comprising a pair of rollers one of which has its upper surface approximately at the level of said floor and the other of which has its upper surface in one position above the level of said floor but is retractable to a second position wherein its upper surface is approximately at the level of said floor, means for increasing the speed of said automobile above that of said conveyor means as it approaches said wheel washing position and means operable after a pair of wheels of said automobile has left said wheel washing position for returning said retractable roller to its original position.

4. In an automobile washing installation the combination of a floor, conveyor means attached by a connecting member to the automobile to be washed for moving said automobile to and away from a wheel washing position, said connecting member comprising means for attaching it to said automobile, means for attaching it to said conveyor means, a chain member extending between said attaching means and a resilient member attached to said chain member near each of said attaching means, means for supporting a pair of wheels of said automobile at said wheel washing position comprising a pair of rollers one of which has its upper surface approximately at the level of said floor and the other of which has its upper surface in one position above the level of said floor, but is retractable to a second position wherein its upper surface is approximately at the level of said floor and means for increasing the speed of said automobile above that of said conveyor means as it approaches said wheel washing position.

5. In an automobile washing installation the combination of a floor, conveyor means attached by a connecting member to the automobile to be washed for moving said automobile to and away from a wheel washing position, said connecting member comprising means for attaching it to said automobile, means for attaching it to said conveyor means, a chain member extending between said attaching means and a resilient member attached to said chain member near each of said attaching means, means for supporting a pair of wheels of said automobile at said wheel washing position comprising a pair of rollers one of which has its upper surface approximately at the level of said floor and the other of which has its upper surface in one position above the level of said floor but is retractable to a second position wherein its upper surface is approximately at the level of said floor and means for increasing the speed of said automobile above that of said conveyor means as it approaches said wheel washing position wherein said last mentioned means comprise a pair of ascending ramps over which said automobile is pulled by said conveyor means and a pair of descending ramps adjacent said first pair of rollers down which said automobile coasts.

6. In an automobile washing installation the combination of a floor, conveyor means attached by a connecting member to the automobile to be washed for moving said automobile to and away from a wheel washing position, said connecting member comprising means for attaching it to said automobile, means for attaching it to said conveyor means, a cable extending between said attaching means and a resilient member attached to said cable near each of said attaching means, means for supporting a pair of wheels of said automobile at said wheel washing position comprising a pair of rollers one of which has its upper surface approximately at the level of said floor and the other of which has its upper surface in one position above the level of said floor but is retractable to a second position wherein its upper surface is approximately at the level of said floor, means for increasing the speed of said automobile above that of said conveyor means as it approaches said wheel washing position and means operable after a pair of wheels of said automobile has left said wheel washing position for returning said retractable roller to its original position.

7. In an automobile washing installation the combination of a floor, conveyor means attached by a connecting member to the automobile to be washed for moving said automobile to and away from a wheel washing position, means for supporting a pair of wheels of said automobile at said wheel washing position comprising a pair of rollers one of which has its upper surface approximately at the level of said floor and the other of which has its upper surface in one position above the level of said floor but is retractable to a second position wherein its upper surface is approximately at the level of said floor, means for increasing the speed of said automobile above that of said conveyor means as it approaches said wheel washing position wherein said last mentioned means comprise a pair of ascending ramps over which said automobile is pulled by said conveyor means and a pair of descending ramps adjacent said first pair of rollers down which said automobile coasts and means operable after a pair of wheels of said automobile has left said wheel washing position for returning said retractable roller to its original position.

8. In an automobile washing installation the combination of a floor, conveyor means attached by a connecting member to the automobile to be washed for moving said automobile to and away from a wheel washing position, said connecting member comprising means for attaching it to said automobile, means for attaching it to said conveyor means, a chain member extending between said attaching means and a resilient member attached to said chain member near each of said attaching means and means for supporting a pair of wheels of said automobile at said wheel washing position comprising a pair of rollers one of which has its upper surface approximately at the level of said floor and the other of which has its upper surface in one position above the level of said floor but is retractable to a second position wherein its upper surface is approximately at the level of said floor, means for increasing the speed of said automobile above that of said conveyor means as it approaches said wheel washing position wherein said last mentioned means comprise a pair of ascending ramps over which said automobile is pulled by said conveyor means and a pair of descending ramps adjacent said first roller down which said automobile coasts and means operable after a pair of wheels of said automobile has left said wheel washing position for returning said retractable roller to its original position.

9. In an automobile washing installation having a floor, a pair of tracks thereon, conveyor means for moving said automobile therealong, a connecting member for each of said automobiles for connecting it to said conveyor means, a pair of ascending ramps in line with said pair of tracks, a pair of descending ramps in line with said pair of tracks, a pit in said flooring adjacent the lower end of said pair of descending ramps, a power driven roller located in said pit and having its upper surface approximately at the level of said floor, a second roller located in said pit, free to revolve around a shaft, having its upper surface above the level of said floor when in an initial position and being adapted to be retracted to a position wherein its upper surface is approximately at the level of said floor whereby said rollers provide support approximately at the level of said floor for a pair of wheels of said automobile, power means for driving said first roller, a wheel washing device, means actuated by contact with a pair of said wheels for starting said power means and starting said washing device said last mentioned means being actuated by a pair of said wheels as soon as said pair of wheels arrives at a wheel washing position and means operating after said automobile wheels have been removed from said rollers for returning said second roller to its initial position.

10. In an automobile washing installation having a floor, a pair of tracks thereon, conveyor means for moving said automobiles therealong, a connecting member for each of said automobiles for connecting it to said conveyor means said connecting member comprising means for attaching it to said automobile, means for attaching it to said conveyor means, a chain member extending between said attaching means and a resilient member attached to said chain member near each of said attaching means, a pair of ascending ramps in line with said pair of tracks, a pair of descending ramps in line with said pair of tracks, a pit in said flooring adjacent the lower end of said pair of descending ramps, a power driven roller located in said pit and having its upper surface approximately at the level of said floor, a second roller located in said pit, free to revolve around a shaft, having its upper surface above the level of said floor when in an initial position and being adapted to be retracted to a position wherein its upper surface is approximately at the level of said floor whereby said rollers provide support approximately at the level of said floor for a pair of wheels of said automobile, power means for driving said first roller, means actuated by contact with a pair of said wheels for starting said power means and starting a washing device said last mentioned means being disposed to be actuated by a pair of said wheels as soon as said pair of wheels arrives at a wheel washing position and means operating after said automobile wheels have been removed from said rollers for returning said second roller to its initial position.

11. In an automobile washing installation the combination of a floor having a pair of tracks thereon, conveyor means for pulling said automobile along said pair of tracks, roller support means for a pair of wheels of said automobile approximately at the level of said floor, means for momentarily increasing the speed of said automobile above that of said conveyor means and for momentarily raising said pair of wheels above the level of said floor, said means for momentarily increasing the speed of said automobile being located adjacent said roller support means whereby said wheels are allowed to rest momentarily approximately at the level of said floor on said roller support means, means for cushioning the descent of said wheels to said roller support means, means for revolving said pair of wheels and means for washing said pair of wheels operable prior to and during the period of said momentary rest.

12. In an automobile washing installation the combination of a floor having a pair of tracks thereon, conveyor means for pulling said automobile along said pair of tracks, a connecting member connecting said conveyor means to said automobile comprising means for attaching said connecting member to said automobile, means for attaching said connecting member to said conveyor means, a chain member extended between said attaching means and a resilient member attached to said chain member near each of said attaching means, said resilient member arranged to exert a force between said means for attaching said chain member to said automobile and said means for attaching said chain member to said conveyor means only when said chain member does not exert a force between said attaching means, roller support means for a pair of wheels of said automobile approximately at the level of said floor, means for momentarily increasing the speed of said automobile above that of said conveyor means and for momentarily raising said pair of wheels above the level of said floor, said means for momentarily increasing the speed of said automobile being located adjacent said roller support means whereby said wheels are allowed to rest momentarily approximately at the level of said floor on said roller support means, means for cushioning the descent of said wheels to said position, means for revolving said pair of wheels and means for washing said pair of wheels operable prior to and during the period of said momentary rest.

References Cited in the file of this patent
UNITED STATES PATENTS

| | | |
|---|---|---|
| 244,713 | Cline | July 19, 1881 |
| 2,490,921 | Rousseau | Dec. 13, 1949 |
| 2,692,214 | Hurst | Oct. 19, 1954 |